Patented Oct. 8, 1929

1,731,081

UNITED STATES PATENT OFFICE

PAUL RABE AND BERTHOLD WENK, OF LEVERKUSEN, AND ERICH HARTMANN, OF WIESDORF, GERMANY, ASSIGNORS TO GENERAL ANILINE WORKS, INC., OF NEW YORK, N. Y., A CORPORATION OF DELAWARE

MOLYBDENUM PHOSPHOTUNGSTATE COMPOUNDS

No Drawing. Application filed May 9, 1927, Serial No. 190,129, and in Germany July 14, 1926.

We have found that by reduction of the two complex molybdenum phosphotungstic acids which have the general formula $$n.(WO_3+MoO_3).P_2O_5.3H_2O,$$

wherein $n$ represents one of the numbers 24 and 18 (compare Journ. Biol. Chemistry 1920 volume 43 H.Wu.) or their salts new compounds can be obtained which are excellently suitable for the manufacture of lakes.

The starting material may be produced in the following manner, all parts being by weight: 100 parts of sodium tungstate 25 parts of sodium molybdate are dissolved in 225 parts of water. Thereto 85 parts of phosphoric acid (85%), 115 parts of 19° Bé. hydrochloric acid, and 2 parts of nitric acid are added. The mixture is boiled for about 8 hours and is then allowed to cool slowly, whereby the sodium salt of the acid of the formula:

$$24(WO_3+MoO_3).P_2O_5.3H_2O$$

separates in large crystals. The addition of ammonia salts to the mother lye causes no turbidity which means that the acid of the formula:

$$24(WO_3+MoO_3).P_2O_5.3H_2O$$

is separated quantitatively. By the addition of about 50 parts of ammonia chloride to the filtrate the acid of the formula:

$$18(WO_3+MoO_3).P_2O_5.3H_2O$$

is salted out.

The reduction may be effected in the usual way for instance in aqueous solution by means of sulphurous acid, bisulphite, hydrosulphite, the lower oxidation products of molybdenum, grape-sugar or the like.

The new products may be precipitated from the reduction solution, for instance with hydrochloric acid. They form black crystals which are soluble in water very easily with deep blue to violet color and still show the characteristic distinctions of the two unreduced molybdenum phosphotungstic acids. Thus, for example, the reduction product from the acid:

$$24(WO_3+MoO_3)P_2O_5.3H_2O$$

like the unreduced compound forms an ammonium salt insoluble in water, while the reduction product from the acid:

$$18(WO_3+MoO_3)P_2O_5.3H_2O$$

like the corresponding unreduced acid forms a water soluble ammonium salt. The reduction products are quite stable in air and can be reconverted in aqueous solution into the original unreduced compounds by the action of oxidizing agents such for example as permanganate, hydrogen peroxide or similar substances.

The following example will illustrate our invention without limiting it thereto:

*Example.*—100 parts by weight of the sodium salt of the complex acid $$24(WO_3+MoO_3)P_2O_5.3H_2O$$

are dissolved in 300 parts of water and after cooling 20 parts by weight of sodium bisulphite solution of 38° Bé. are added. Then gradually heating to boiling is effected and continued for some time. After cooling, hydrochloric acid gas is passed into the reduction mixture, whereby the reduction product separates in beautiful black crystals. The crystals dissolve in water very easily with a dull, bluish violet coloration.

We claim:

1. New molybdenum-phosphotungstate compounds obtainable by reduction of the molybdenum phosphotungstic acids of the general formula:

$$n.(WO_3+MoO_3).P_2O_5.3H_2O$$

wherein $n$ represents one of the numbers 18 and 24 forming black crystals which are soluble in water very easily with deep blue to violet color being quite stable in air and rconvertible into the molybdenum phosphotungstic acids by means of oxidizing agents.

2. A new molybdenum phosphotungstate compound obtainable by reduction of the molybdenum phosphotungstic acid of the formula $$24(WO_3+MoO_3)P_2O_5.3H_2O$$

forming black crystals, which are soluble in water very easily with a dull, bluish violet coloration being stable in air, reconvertible into the original molybdenum phosphotungstic acid by means of oxidizing agents and forming an ammonium salt, which is insoluble in water.

In testimony whereof, we affix our signatures.

PAUL RABE.
BERTHOLD WENK.
ERICH HARTMANN.